United States Patent
Lee et al.

(10) Patent No.: US 8,273,488 B2
(45) Date of Patent: Sep. 25, 2012

(54) PLATE-TYPE HEAT EXCHANGER AND FUEL CELL SYSTEM WITH THE SAME

(75) Inventors: Chan-Ho Lee, Suwon-si (KR); Ju-Yong Kim, Suwon-si (KR); Sung-Chul Lee, Suwon-si (KR); Jin-Goo Ahn, Suwon-si (KR); Jin-Kwang Kim, Suwon-si (KR); Dong-Myung Suh, Suwon-si (KR); Leonid Gorobinskiy, Suwon-si (KR); Man-Seok Han, Suwon-si (KR); Yong-Kul Lee, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1662 days.

(21) Appl. No.: 11/650,415

(22) Filed: Jan. 8, 2007

(65) Prior Publication Data

US 2007/0160885 A1   Jul. 12, 2007

(30) Foreign Application Priority Data

Jan. 6, 2006   (KR) .................. 10-2006-0001695

(51) Int. Cl.
*H01M 8/04* (2006.01)
*H01M 8/06* (2006.01)
*F28F 3/00* (2006.01)

(52) U.S. Cl. ........ 429/414; 429/423; 429/436; 429/440; 165/164; 165/166

(58) Field of Classification Search .................. None
See application file for complete search history.

(56) References Cited

U.S. PATENT DOCUMENTS

| 1,662,870 | A | * | 3/1928 | Stancliffe | 165/166 |
|---|---|---|---|---|---|
| 4,744,414 | A | * | 5/1988 | Schon | 165/167 |
| 5,360,679 | A | * | 11/1994 | Buswell et al. | 429/414 |
| 7,160,638 | B1 | * | 1/2007 | Duebel et al. | 429/420 |
| 2002/0110504 | A1 | * | 8/2002 | Gittleman et al. | 422/190 |
| 2003/0164233 | A1 | * | 9/2003 | Wu et al. | 165/166 |
| 2005/0069741 | A1 | * | 3/2005 | Enokizu et al. | 429/26 |

FOREIGN PATENT DOCUMENTS

| EP | 735602 A1 | * | 10/1996 |
|---|---|---|---|
| JP | 2000-302402 | * | 10/2000 |
| WO | WO 99/60647 | * | 11/1999 |

* cited by examiner

*Primary Examiner* — Jonathan Crepeau
(74) *Attorney, Agent, or Firm* — Robert E. Bushnell, Esq.

(57) ABSTRACT

A plate-type heat exchanger for use in a fuel cell system that has a fuel cell stack and a reformer is provided. The heat exchanger includes a substrate and a pair of cover plates. The substrate has a first face and a second face opposite to the first face. The substrate is disposed between the cover plates, and combined with the cover plates to form a first passageway and a second passageway. The first passageway is formed in the first face and circulates steam discharged from the fuel cell stack. The steam or water condensed from the steam is supplied to a water supply source. The second passageway is formed in the second face, and circulates water supplied from the water supply source. The water is supplied to the reformer after the circulation. The heat exchanger of the present invention improves performance and efficiency of a fuel cell system.

10 Claims, 7 Drawing Sheets

PLATE-TYPE HEAT EXCHANGER AND FUEL CELL SYSTEM WITH THE SAME

CLAIM OF PRIORITY

This application makes reference to, incorporates the same herein, and claims all benefits accruing under 35 U.S.C. §119 from an application for HEAT EXCHANGER OF PLATE TYPE AND FUEL CELL SYSTEM KITH THE SAME earlier filed in the Korean Intellectual Property Office on the 6 of Jan. 2006 and there duly assigned Serial No. 10-2006-0001695.

BACKGROUND OF THE INVENTION

1. Field of the Invention

The present invention relates to a fuel cell system, and more particularly, to a heat exchanger for a fuel cell system that has a fuel cell stack and a reformer.

2. Description of the Related Art

A fuel cell system generates electricity through an oxidation reaction of hydrogen contained in fuel and through a reduction reaction of oxygen. In more detail, a fuel cell system can be configured to generate electrical energy through an oxidation reaction of hydrogen generated by reformed fuel, and through a reduction reaction of oxygen that is separately supplied.

The fuel cell system includes a reformer, a fuel supply apparatus, and an oxygen supply apparatus. The reformer reforms a fuel to a reformed fuel from which hydrogen is generated. The reformer supplies the hydrogen to a fuel cell. The fuel supply apparatus supplies a fuel to the reformer, and an oxygen supply apparatus supplies oxygen to the fuel cell.

In the fuel cell system, high-temperature steam is generated through reduction reaction of oxygen, and is typically discharged during operation of the fuel cell. If this steam is directly discharged into air, which is at a relatively low temperature, the steam is condensed into water as the steam contacts the air. If the fuel cell system is installed in an application system without any means to manage the water produced during the operation of the fuel cell system, water will flow from the fuel cell system, and will drip into the application system The water will cause damages in the application system, which is not desirable to the application system. Therefore, a fuel cell system requires a type of heat exchanger to condense steam generated in the fuel cell into water, and to reuse the water, thereby preventing the water from dripping from the fuel cell system.

An application system having a fuel cell system is generally configured to include a heat exchanger having a fan that is disposed in a separate housing. The heat exchanger having a fan, however, is bulky, and has limitations in making the application system compact. The fuel cell system having the bulky heat exchanger cannot be used in portable electronic devices.

Furthermore, if a fan is included in a heat exchanger, additional electrical energy is required to drive the fan. As a result, in addition to power needed to drive the fuel cell system, separate power (parasitic power) is required to drive the fan, thereby deteriorating the performance and efficiency of the overall fuel cell system. There is also problems of noise the fan generates during the operation.

SUMMARY OF THE INVENTION

Embodiments of the present invention provide a plate-type heat exchanger having a simple structure to solve the problems mentioned above. The heat exchanger of the present invention utilizes a high-temperature byproduct (steam or exhaust gas) discharged from a fuel cell stack or a reformer to pre-heat water required for driving a fuel cell system.

In an exemplary embodiment of the present invention, a heat exchanger for use in a fuel cell system, which has a fuel cell stack and a reformer, includes a substrate having a first face and a second face, a first channel formed on the first face of the substrate, a second channel formed on the second face of the substrate, a first cover plate disposed on the first face of the substrate, and a second cover plate disposed on the second face of the substrate. The first channel circulates steam discharged from the fuel cell stack, and the second channel circulates water and supplies the water to the reformer.

The substrate can be made of a thermally conductive metal material.

The first cover plate contacts the first face and covers the first channel to form a first passageway in the first channel. The second cover plate contacts the second face and covers the second channel to form a second passageway in the second channel.

The heat exchanger can further include a first entrance formed at one end of the first passageway, a first exit formed at another end of the first passageway, a second entrance formed at one end of the second passageway, and a second exit formed at another end of the second passageway.

Each of the first and second channels of the heat exchanger can be formed in a stripe pattern to effectively exchange heat between the first channel and the second channel.

In another exemplary embodiment of the present invention, a plate-type heat exchanger for use in a fuel cell system, which has a fuel cell stack and a reformer, includes a first substrate having a first face and a second face, a first channel formed on the first face of the first substrate, a second substrate having a first face and a second face, a second channel formed on the first face of the second substrate, a first cover plate disposed on the first face of the first substrate, and a second cover plate disposed on the first face of the second substrate. The first channel circulates steam discharged from the fuel cell stack, and the second channel circulates water and supplies the water to the reformer. The second face of the second substrate contacts the second face of the first substrate.

Each of the first and second substrates can be formed of a thermally conductive metal material.

The first cover plate contacts the first face of the first substrate and covers the first channel to form a first passageway in the first channel, and the second cover plate contacts the first face of the second substrate and covers the second channel to form a second passageway in the second channel.

In still another exemplary embodiment of the present invention, a plate-type heat exchanger for use in a fuel cell system, which has a fuel cell stack and a reformer, includes a substrate, a first channel formed in the substrate, and a second channel formed in the substrate. The first channel circulates a gas discharged from the reformer, and the second channel circulates water and supplies the water to the reformer.

In still yet another exemplary embodiment of the present invention, a fuel cell system includes a fuel cell stack for producing electricity by a reaction of hydrogen and oxygen, a reformer coupled to the fuel cell stack for reforming fuel, a fuel supply source coupled to the reformer, a water supply source for storing and supplying water, and a heat exchanger coupled to each of the fuel cell stack, the reformer, and the water supply source. The reformer produces a reformed gas from a fuel supplied from the fuel supply source, and supplies the reformed gas to the fuel cell stack. The fuel supply source supplies a fuel to the reformer, and the water supply source supplies water to the reformer. The heat exchanger includes a first passageway for circulating steam discharged from the fuel cell stack, and a second passageway for circulating water supplied from the water supply source. The steam or water condensed from the steam is supplied to the water supply source after the circulation in the first passageway, and the water is supplied to the reformer after the circulation in the second passageway.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention will now be described more completely with reference to the accompanying drawings, in which exemplary embodiments of the invention are shown. The invention may, however, be embodied in many different forms and should not be construed as being limited to the embodiments set forth herein. These embodiments are rather provided so that this disclosure will be thorough and complete, and will completely convey the concept of the invention to those skilled in the art.

Figure 1:
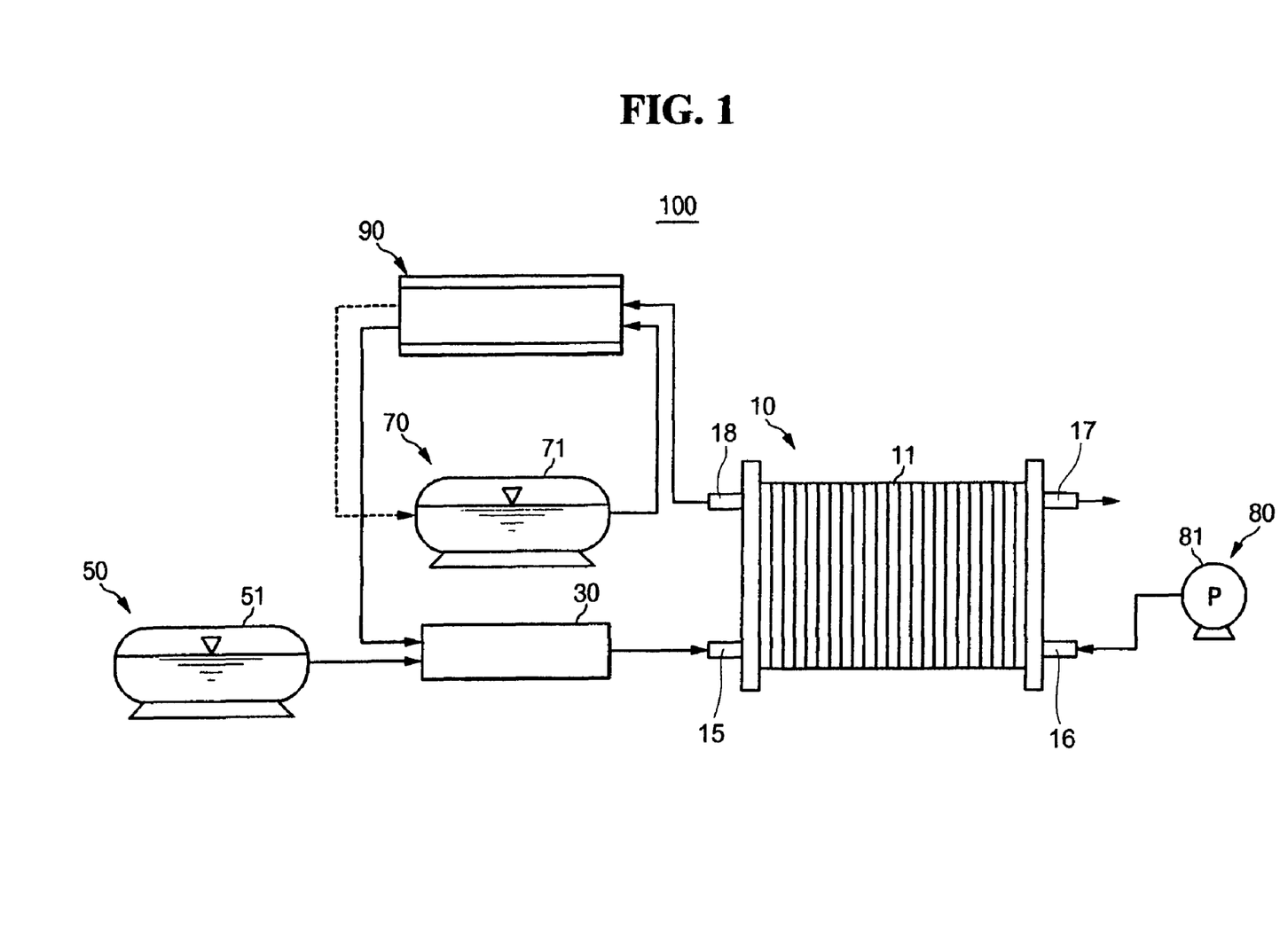
FIG. 1 is a schematic view of a fuel cell system constructed as an exemplary embodiment of the present invention.

FIG. 1 is a schematic view of a fuel cell system constructed as an exemplary embodiment of the present invention. Referring to FIG. 1, fuel cell system 100 of the present invention is a system that produces electricity through an electrochemical reaction of a fuel and an oxidant gas. In more detail, fuel cell system 100 is a polymer electrode membrane fuel cell system, which includes a reformer that generates a reformed gas containing hydrogen by reforming a fuel, and a fuel cell stack that generates electricity through an oxidation reaction of the reformed gas and a reduction reaction of an oxidant gas. The fuel used in fuel cell system 100 can be a hydrocarbon group liquid or gas containing hydrogen, such as methanol, ethanol, LPG, LNG, or gasoline.

For the oxidant gas, fuel cell system 100 can use an oxygen gas held in a separate storage device, or can simply use atmospheric air which contains oxygen. In the following description, it is assumed that oxidant gas is supplied from atmospheric air.

Fuel cell system 100, which is a polymer electrode membrane fuel cell system as described above, includes fuel cell stack 10 for generating electricity, reformer 30 for producing a reformed gas, fuel supply source 50 for supplying fuel to reformer 30, water supply source 70 for supplying water to reformer 30, and air supply source 80 for supplying air to fuel cell stack 10. Reformer 30 reforms a mixture of fuel and water to produce reformed gas that contains hydrogen, and supplies the reformed gas to fuel cell stack 10.

Fuel cell stack 10 includes a plurality of electricity generators 11, which are connected to reformer 30 and air supply source 80. Electricity generators 11 receive reformed gas from reformer 30 and air from air supply source 80, and then generate electricity through an electrochemical reaction between hydrogen contained in the reformed gas and oxygen contained in the air. Electricity generators 11 are disposed in series, and closely contact one another to be formed into a stack. Fuel cell stack 10 further includes reformed gas inlet 15, air inlet 16, reformed gas outlet 17, and steam outlet 18, which will be described in detail referring to FIG. 2.

Fuel supply source 50, which supplies fuel to reformer, includes fuel tank 51 for storing fuel. Fuel tank 51 is connected to reformer 30 through a pipe. If fuel is liquid, fuel tank 51 can be coupled to a pump (not shown), and supplies the fuel by operating the pump. If the fuel is a gas, the fuel can be supplied to reformer 30 by pressure of the gas itself.

Water supply source 70, which supplies water to reformer 30, includes water tank 71. Water tank 71 is connected to reformer 30 through a pipe. Water tank 71 can be coupled to a pump (not shown), and supplies water to reformer 30 by operating the pump.

Air supply source 80, which supplies air to fuel cell stack 10, includes air pump 81 that pressurize and drive air into fuel cell stack 10. Air pump 81 is connected to air inlet 16 of fuel cell stack 10 through a pipe.

Fuel cell system 100 further includes heat exchanger 90, which will be described in detail referring to FIG. 3.

Figure 2:
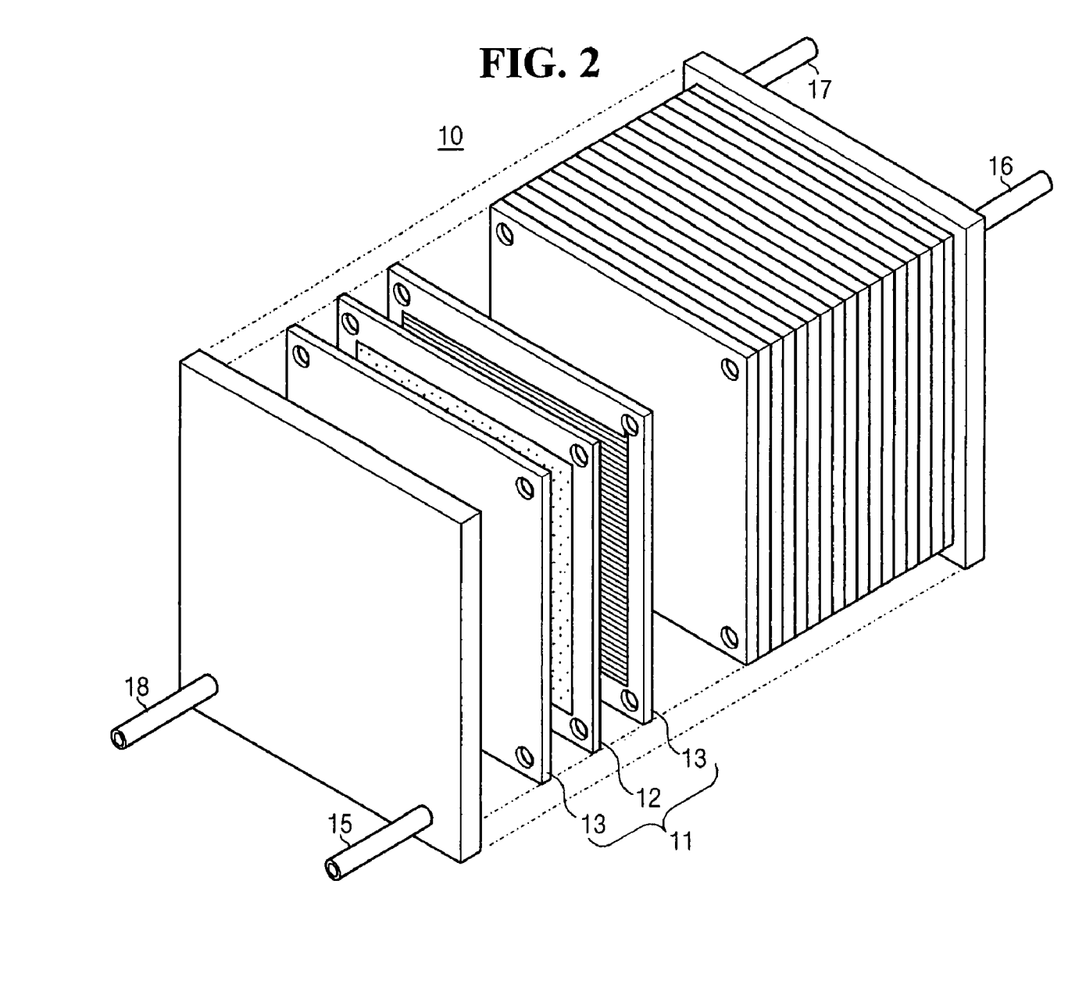
FIG. 2 is a partial exploded perspective view of a fuel cell stack of the fuel cell system of FIG. 1.

FIG. 2 is a partial exploded perspective view of fuel cell stack 10 of FIG. 1. Fuel cell stack 10 is formed of an assembly of electricity generators 11 as described above. Each of electricity generators 11 can include membrane-electrode assembly (MEA) 12 and separators 13, where MEA 12 is disposed between two separators 13.

An anode electrode (not shown) is formed on one face of MEA 12, and a cathode (not shown) is formed on the other face of MEA 12. An electrolyte film (not shown) is formed between the anode and cathode electrodes. The anode electrode induces an oxidation reaction of the hydrogen, which is contained in the reformed gas, and separates the hydrogen into electrons and hydrogen ions. The electrolyte film allows the hydrogen ions to flow to the cathode electrode. The cathode electrode induces a reduction reaction with the electrons, hydrogen ions received from the anode electrode, and oxygen contained in the air. As a result of the reduction reaction, heat and steam are produced.

Separators 13 at the anode side disperses and supplies the reformed gas to the anode electrode of MEA 12, and separators 13 at cathode side disperses and supplies the air to the cathode electrode of MEA 12. Separators 13 are also conductors that electrically couples the anode electrode of MEA 12 to the cathode electrodes of the MEA 12.

Fuel cell stack 10 includes reformed gas inlet 15 (hereinafter referred to as a first inlet) through which reformed gas is supplied to electricity generators 11, air inlet 16 (hereinafter referred to as a second inlet) through which air is supplied to electricity generators 11, an reformed gas outlet 17 (hereinafter referred to as a first outlet) through which reformed gas remaining after reaction in electricity generators 11 is discharged, and steam outlet 18 (hereinafter referred to as a second outlet) through which steam generated during a reduction reaction in electricity generators 11 is discharged.

Reformer 30 burns fuel through ignition and an oxidation reaction, and generates thermal energy within a predetermined temperature range. A reformed gas containing hydrogen is produced through a mixed fuel reforming reaction, such as a steam reforming reaction, which is driven by the thermal energy generated through the oxidation reaction.

Reformer 30 is coupled to first inlet 15 of fuel cell stack 10 through a pipe. Because reformer 30 can be a reformer that is generally used in a polymer electrode membrane fuel cell, a detailed description of the reformer is omitted herein.

During operation of fuel cell system 100 having a structure as described above, fuel cell stack 10 produces steam through a reduction reaction of oxygen taken place in electricity generators 11, and the steam is discharged through second outlet 18. Fuel cell system 100 of this exemplary embodiment includes heat exchanger 90 (shown in FIG. 1) for condensing the steam discharged through second outlet 18.

As shown in FIG. 1, heat exchanger 90 is connected to both of fuel cell stack 10 and water tank 71. Heat exchanger 90 has a shape of a plate, and circulates the steam discharged from fuel cell stack 10. Heat exchanger also circulates water supplied from water tank 71, and supplies the water into reformer 30. Through the circulation of the high-temperature steam and the relatively low-temperature water, the thermal energy of the steam is transferred to the water, and thereby the steam is condensed into water.

Figure 3:
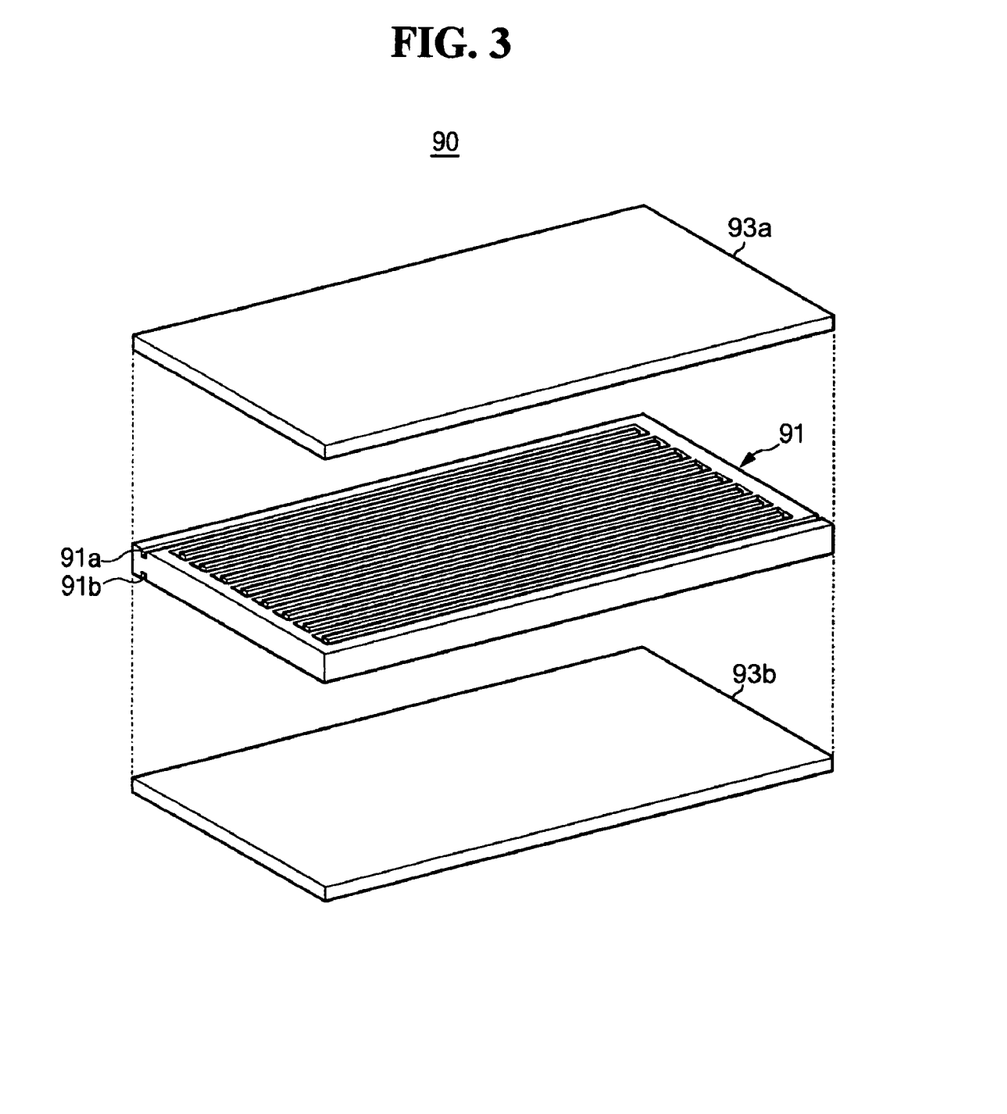
FIG. 3 is an exploded perspective view of a heat exchanger constructed as a first embodiment of the present invention.
Figure 4:
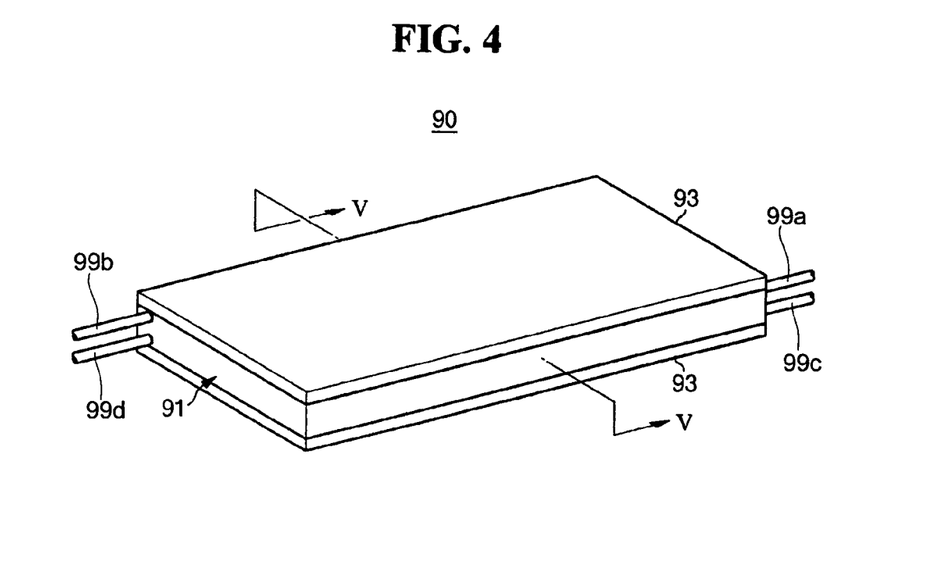
FIG. 4 is a perspective view of the heat exchanger of FIG. 3 when the heat exchanger is assembled.
Figure 5:
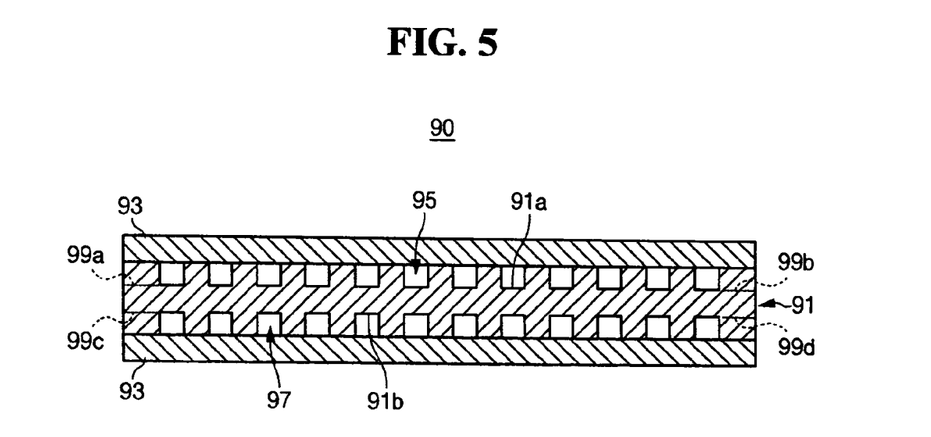
FIG. 5 is a sectional view taken along ling V-V of the heat exchanger of FIG. 4.

FIG. 3 is an exploded perspective view of a plate-type heat exchanger constructed as a first exemplary embodiment of the present invention, FIG. 4 is a perspective view of the plate-type heat exchanger of FIG. 3 when the heat exchanger is assembled, and FIG. 5 is a sectional view taken along ling V-V of the heat exchanger of FIG. 4.

Referring to FIGS. 3, 4, and 5, heat exchanger 90 of the first exemplary embodiment includes substrate 91 having a first face and a second face, a first cover plate 93a disposed on the first face, and a second cover plate 93b disposed on the second face. First channel 91a is formed in the first face for circulating steam discharged from fuel cell stack 10 (shown in FIG. 1). Second channel 91b is formed in the second face for circulating water supplied from water tank 71 and for supplying the water to reformer 30 (shown in FIG. 1).

Substrate 91 is in a form of a plate that is approximately rectangular in shape with a predetermined width and length, and is formed of a metal material that is thermally conductive, such as aluminum, stainless steel, copper, nickel, or steel.

First channel 91a can be formed in spaces between ribs, which protrude from the surface of the first face of substrate 91 and are arranged with a predetermined intervals between adjacent ribs. First channel 91a can be formed in a stripe configuration or pattern as shown in FIG. 3. Herein, the stripe pattern means a pattern having a plurality of stripes, where ends of the stripes are connected to an end of adjacent stripe in an alternating manner. Therefore, each of the stripes are continuously connected one another.

Second channel 91b can be formed in spaces between ribs, which protrude from the surface of the second face of substrate 91 and are arranged with a predetermined intervals between adjacent ribs. Second channel 91b also can be formed in a stripe pattern. FIG. 3 shows first channel 91a and second channel 91b formed in the stripe pattern, but the shape or pattern of first channel 91a or second channel 91b is not limited to the stripe pattern. Any type of pattern can be employed to first channel 91a and second channel 91b as long as a pattern on one face of substrate 91 can effectively transfer heat to another pattern of another face of substrate 91.

The stripe configuration of first channel 91a of substrate 91 is employed to increase the length of the circulation path of the steam discharged from second outlet 18 (shown in FIG. 2), and the stripe configuration of second channel 91b of substrate 91 to increase the length of the circulation path of the water that is supplied from water tank 71 (shown in FIG. 1).

First cover plate 93a and second cover plate 93b are formed in a shape of a plate, and cover first face and second face of substrate 91, respectively. As in the case of substrate 91, first cover plate 93a and second cover plate 93b can be made of a thermally conductive metal material.

First cover plate 93a and second cover plate 93b are connected to the first and second faces of substrate 91, respectively, using a fastener (e.g., bolts and nuts) in a manner that each of cover plates closely contacts outer surfaces of the ribs formed on the surface of each face of substrate 91. Other connecting means, such as welding or brazing, can be employed to couple first cover plate 93a or second cover plate 93b to substrate 91.

As shown in FIG. 5, first passageway 95 is formed in first channel 91a through the coupling of first cover plate 93a to the first face of substrate 91. First cover plate 93a works as a ceiling that covers first channel 91a, and prevents steam, which is discharged from second outlet 18 of fuel cell stack 10, from leaking from first passageway 95. In the same manner, second passageway 97 is formed in second channel 91b through the coupling of second cover plate 93b to the second face of substrate 91. Second cover plate 93b covers second channel 91b, and prevents water, which is supplied from water tank 71, from leaking from second passageway 97.

Heat exchanger 90 further includes first entrance 99a formed at one end of first passageway 95, first exit 99b formed at another end of first passageway 95, second entrance 99c formed at one end of second passageway 97, and second exit 99d formed at another end of second passageway 97. First entrance 99a is connected to second outlet 18 of fuel cell stack 10 through a pipe, and allows the steam discharged from second outlet 18 to enter first passageway 95. The thermal energy of the high-temperature steam circulating through first passageway 95 is transferred to the relatively low-temperature water flowing through second passageway 97, and therefore the steam is gradually condensed into water, and the water or the non-condensed steam is discharged through first exit 99b.

First exit 99b is connected to water tank 71 or a separate water collecting means through a pipe. Second entrance 99c is connected to water tank 71 through a pipe, and allows the water supplied from water tank 71 to enter second passageway 97. The relatively low-temperature water circulates through second passageway 97, and receives the thermal energy transferred from the high-temperature steam circulating through first passageway 95, and therefore the water is gradually heated. The heated water is discharged through second exit 99d. Second exit 99d is connected to reformer 30 through a pipe.

The operation of fuel cell system 100 of the present invention will now be described in detail. During operation of fuel cell system 100, the fuel stored in fuel tank 51 and the water stored in water tank 71 are supplied to reformer 30. The water stored in water tank 71 is first introduced into second passageway 97 of heat exchanger 90 through second entrance 99c. The water circulates through second passageway 97, and is discharged through second exit 99d to be supplied to reformer 30. The fuel and water, which are supplied from fuel tank 51 and water tank 71, respectively, are mixed forming a mixed fuel. Reformer 30 performs a steam reforming reaction with the mixed fuel (a mixture of the fuel and the water), and produces a reformed gas containing hydrogen. The reformed gas is supplied to electricity generators 11 through first inlet 15 of fuel cell stack 10.

During the processes described above, air pump 81 pumps air into electricity generators 11 through second inlet 16 of fuel cell stack 10. Electricity generators 11 of fuel cell system 100 simultaneously receives the reformed gas and the air, and generate electricity through the oxidation reaction of the reformed gas and the reduction reaction of the oxygen of the air.

As a result of the reduction reaction of oxygen in electricity generators 11, fuel cell stack 10 produces high-temperature steam. The steam is discharged through second outlet 18 of fuel cell stack 10. Concurrently, the water stored in water tank 71 continuously circulates through second passageway 97 of heat exchanger 90, and is supplied to reformer 30. The high-temperature steam discharged through second outlet 18 of fuel cell stack 10 is introduced into first passageway 95 through first entrance 99a of heat exchanger 90. Because the relatively low-temperature water circulates through second passageway 97, the thermal energy of the steam circulating through first passageway 95 is transferred to the water circulating through second passageway 97, and the temperature of water in second passageway 97 increases.

Accordingly, the steam circulating through first passageway 95 loses its thermal energy to the water circulating through second passageway 97, and is condensed into water. The water resulting from the condensation is discharged through exit 99b, and is collected in water tank 71 or a separated collecting means. At the same time, the water, which circulates through second passageway 97 and receives the thermal energy of the steam, is discharged through second exit 99d to be supplied to reformer 30.

Figure 6:
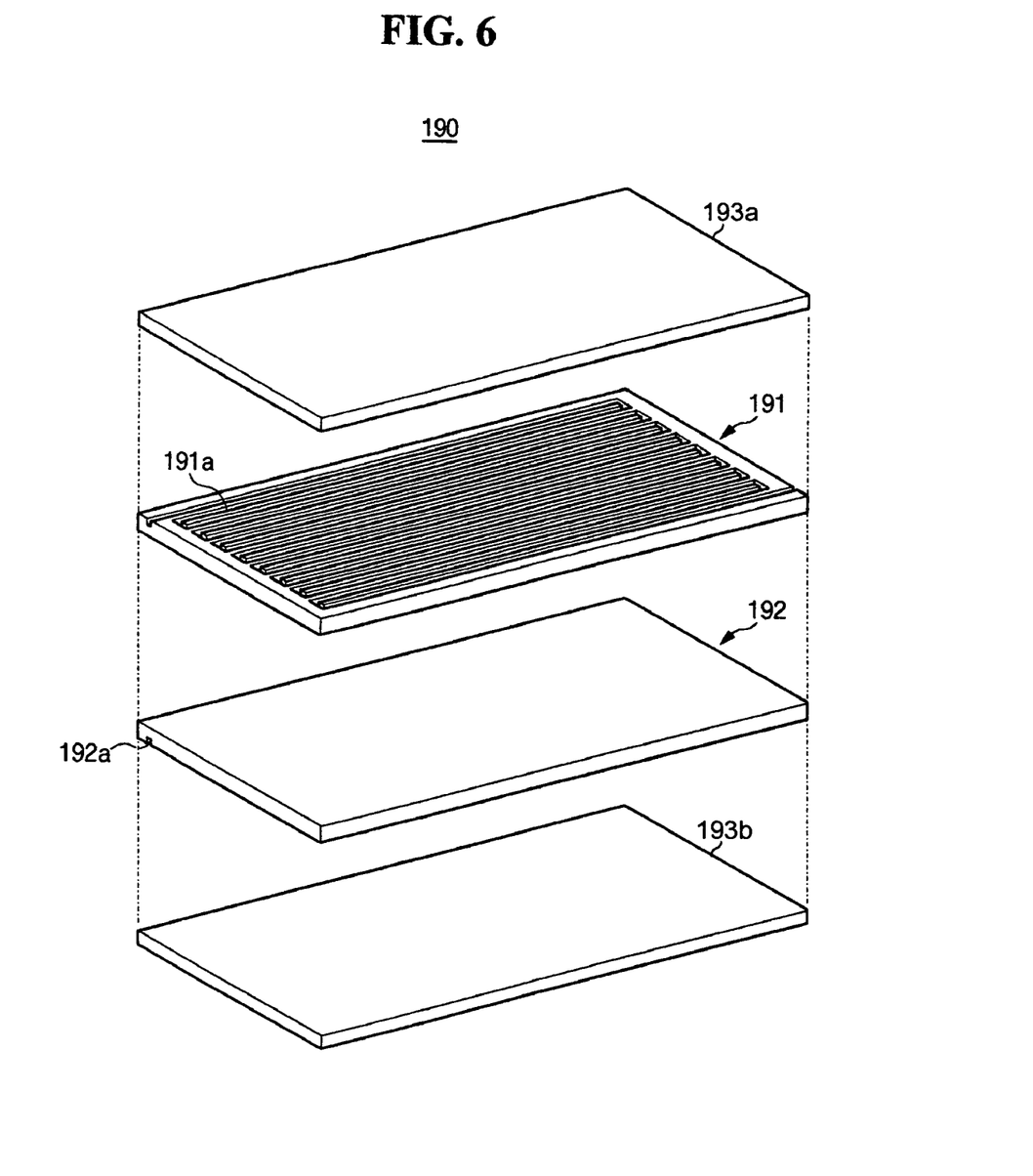
FIG. 6 is an exploded perspective view of a heat exchanger of a fuel cell system constructed as a second exemplary embodiment of the present invention.
Figure 7:
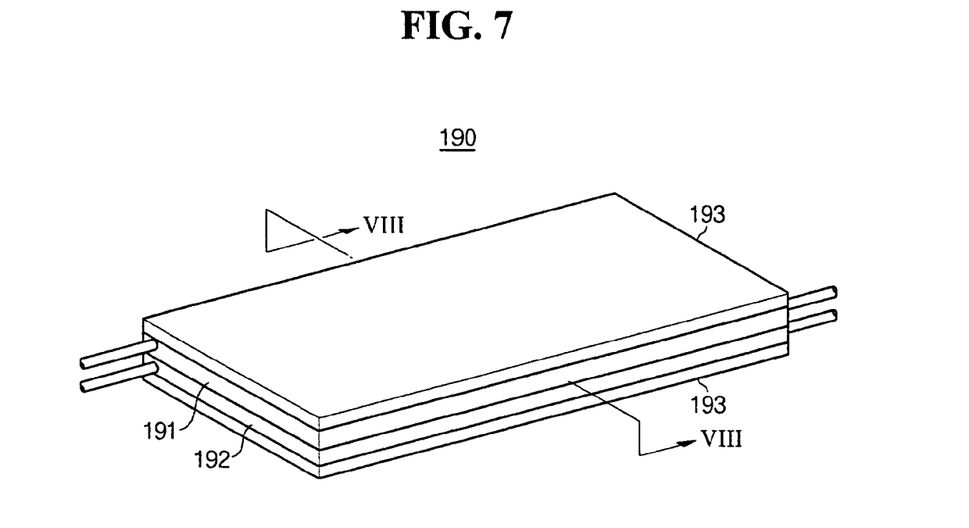
FIG. 7 is a perspective view of the heat exchanger of FIG. 6 when the heat exchanger is assembled.
Figure 8:
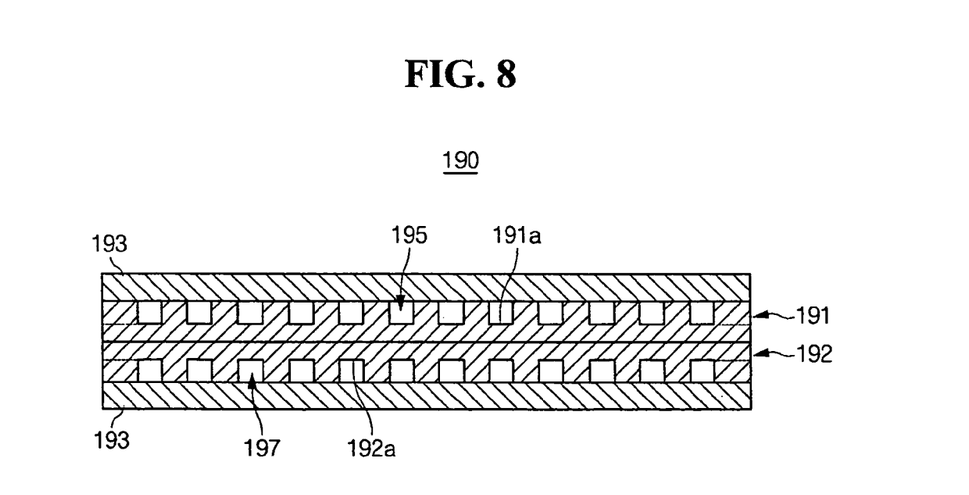
FIG. 8 is a sectional view taken along line VIII-VIII of the heat exchanger of FIG. 7.

FIG. 6 is an exploded perspective view of a plate-type heat exchanger constructed as a second exemplary embodiment of the present invention, FIG. 7 is a perspective view of the plate-type heat exchanger of FIG. 6 when the heat exchanger is assembled, and FIG. 8 is a sectional view taken along line VIII-VIII of the heat exchanger of FIG. 7.

Referring to FIGS. 6, 7, and 8, heat exchanger 190 of the second embodiment has the same basic structure as the heat exchanger of the first embodiment. Heat exchanger 190, however, includes first substrate 191 for flowing high-temperature steam discharged from fuel cell stack 10 (shown in FIG. 1), and second substrate 192 for flowing relatively low-temperature water supplied from water tank 71 (shown in FIG. 1). First substrate 191 is disposed to contact second substrate 192.

First substrate 191 has a first face having first channel 191a for circulating high-temperature steam, and a second face opposite to the first face. The second face of first substrate 191 is substantially planar. Second substrate 192 has a first face having second channel 192a for circulating relatively low-temperature water, and a second face opposite to the first face. The second face of second substrate 192 is substantially planar. Each of the first substrate 191 and second substrate 192 is in a form of a plate that is approximately rectangular in shape with a predetermined width and length, and is made of a metal material that is thermally conductive, such as aluminum, stainless steel, copper, nickel, or steel.

First cover plates 193a is connected to the first face of first substrate 191, and second cover plate 193b to the first face of second substrate 192. Accordingly, first passageway 195 is formed in first channel 191a through the coupling of first cover plates 193a to first substrate 191. First cover plate covers first passageway 195, and prevents high-temperature steam from leaking from first passageway 195. Second passageway 197 is formed in second channel 192a through the coupling of second cover plates 193b to second substrate 192. Second cover plate 193b, covering second passageway 197, prevents relatively low-temperature water from leaking from second passageway 197.

The second face of first substrate 191 contacts the second face of second substrate 192, and first and second substrates 191 and 192 are combined using a fastener (e.g., nuts and bolts). Other conventional combining means can be employed.

In the second exemplary embodiment of the present invention, high-temperature steam discharged from fuel cell stack 10 (see FIG. 1) circulates through first passageway 195, and relatively low-temperature water supplied from water tank 71 (see FIG. 1) circulates through second passageway 197. As a result, the thermal energy of the steam circulating through first passageway 195 is transferred to first substrate 191, heating first substrate 191 to a predetermined temperature. Because first substrate 191 contacts second substrate 192, the thermal energy of first substrate 191 is transferred to second substrate 192, and is eventually transferred to the water circulating through second passageway 197.

Hence, the steam circulating through first passageway 195 loses its thermal s energy to the water circulating through second passageway 197, and is condensed into water. The water circulating through second passageway 197 receives thermal energy of the steam, and is heated to a predetermined temperature. The heated water is supplied to reformer 30 (see FIG. 1).

All other aspects of heat exchanger 190 (i.e., its configuration and operation) are identical to those of the heat exchanger of the first embodiment, and a detailed description thereof is not provided herein.

Figure 9:
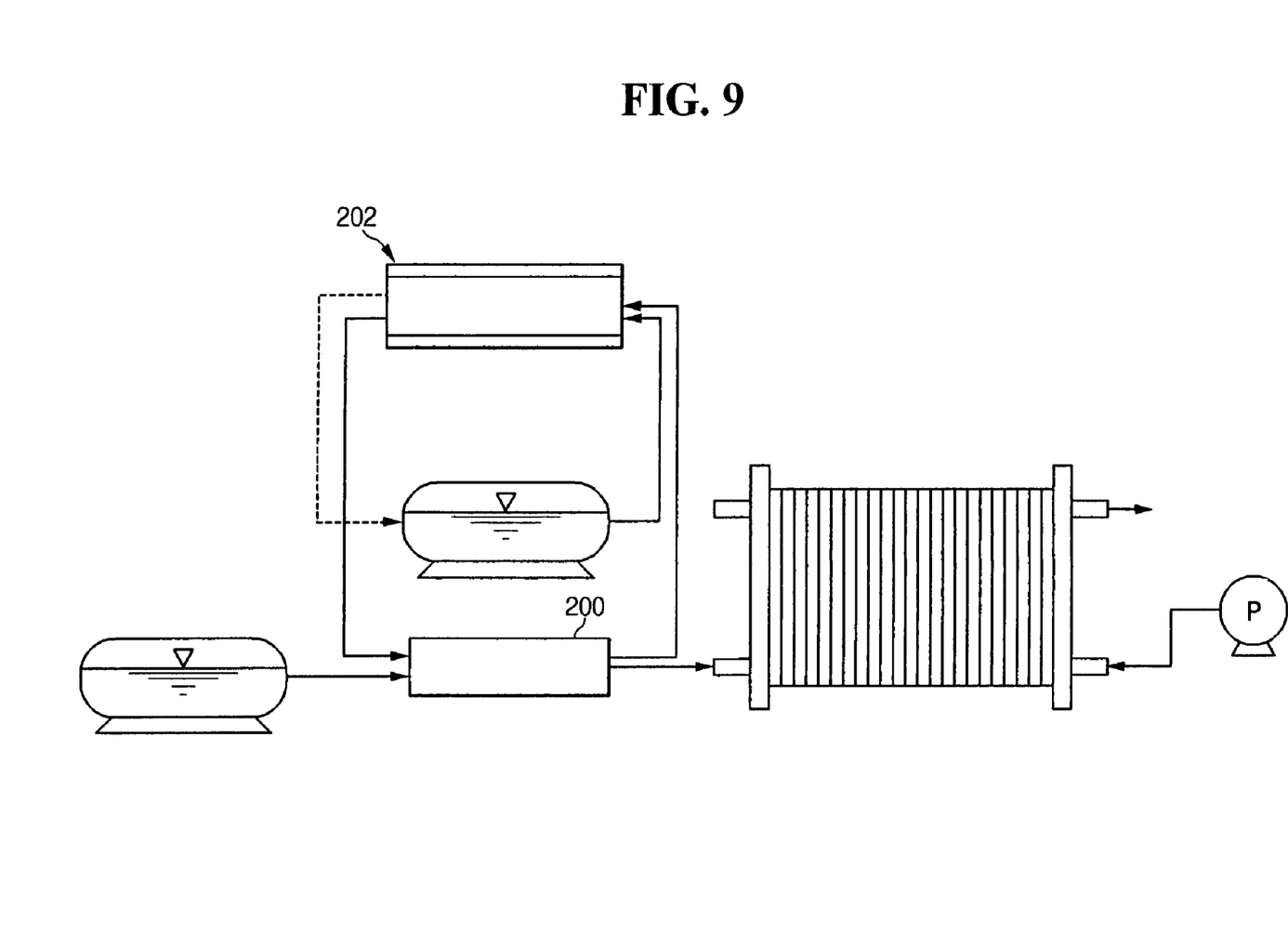
FIG. 9 is a schematic view of a fuel cell system including a heat exchanger constructed as a third exemplary embodiment of the present invention.

FIG. 9 is a schematic view of a fuel cell system including a plate-type heat exchanger constructed as a third exemplary embodiment of the present invention. Referring to FIG. 9, high-temperature exhaust gas produced in reformer 200 during reforming process is supplied to heat exchanger 202, and water supplied to reformer 200 is pre-heated by the high-temperature exhaust gas.

Heat exchanger 202 can be a heat exchanger described in the first and the second embodiments of the present invention. The fuel cell system of the third embodiment of the present invention includes a heat exchanger that is able to utilize the heat energy of the byproduct discharged from the fuel cell stack or the reformer (i.e., steam or combustion exhaust gas) to pre-heat the water that is to be supplied to the reformer. As a result, the overall heat efficiency and performance of the reformer are enhanced.

The heat exchanger of the present invention does not require a case and ventilation fan, which are required for a conventional heat exchanger in order to condense the steam produced in the fuel cell stack. Hence, the overall size of the fuel cell system of the present invention can be made more compact. Furthermore, the parasitic electrical energy required to drive the ventilation fan is not necessary, and there is no noise that is generated from the ventilation fan. Therefore, the heat exchanger of the present invention improves overall performance and energy efficiency of the fuel cell system.

Although exemplary embodiments of the present invention have been shown and described, it will be appreciated by those skilled in the art that changes may be made in this embodiment without departing from the principles and spirit of the invention, the scope of which is defined in the claims and their equivalents.

What is claimed is:

1. A heat exchanger in a fuel cell system that includes a fuel cell stack, a reformer and a water tank, the heat exchanger comprising:
a substrate having a first face and a second face;
a first channel arranged in the first face of the substrate, the first channel circulating, cooling and condensing steam discharged only from the fuel cell stack and supplying the circulated cooled and condensed steam to the water tank;
a second channel arranged in the second face of the substrate, the second channel circulating and heating water supplied from the water tank and supplying the circulated and heated water to the reformer;
a first cover plate arranged on the first face of the substrate; and
a second cover plate arranged on the second face of the substrate, wherein each of the first and second channels has a serpentine pattern comprised of a plurality of interconnected stripes, wherein stripes of the first channel are parallel to stripes of the second channel.

2. The heat exchanger of claim 1, the substrate being comprised of a metal selected from a group consisting of aluminum, stainless steel, copper, nickel and steel.

3. The heat exchanger of claim 1, wherein the first cover plate contacts the first face and covers the first channel to form a first passageway in the first channel, and the second cover plate contacts the second face and covers the second channel to form a second passageway in the second channel.

4. The heat exchanger of claim 3, further comprising:
a first entrance arranged at one end of the first passageway;
a first exit arranged at another end of the first passageway;
a second entrance arranged at one end of the second passageway; and
a second exit arranged at another end of the second passageway, each of the first channel and the second channel having a serpentine shape.

5. A heat exchanger in a fuel cell system that includes a fuel cell stack, a reformer and a water tank, the heat exchanger comprising:
a metal substrate;
a first channel arranged in the metal substrate, the first channel circulating and cooling a gas discharged from the reformer, the circulated and cooled gas being directly supplied to the water tank; and
a second channel arranged in the metal substrate, the second channel circulating and heating water supplied from the water tank and supplying the circulated and heated water to the reformer, each of the first channel and the second channel being serpentine-shaped.

6. A fuel cell system, comprising:
a fuel cell stack to produce electricity by a reaction of hydrogen and oxygen;
a reformer coupled to the fuel cell stack to reform a fuel to produce the hydrogen and to supply the hydrogen to the fuel cell stack;
a fuel supply source coupled to the reformer to supply the fuel to the reformer;
a water tank to store water and to supply water to the reformer; and
a heat exchanger coupled to each of the fuel cell stack, the reformer, and the water tank, the heat exchanger comprising:
a first passageway to circulate, cool and condense steam discharged only from the fuel cell stack, the circulated and cooled steam or water condensed from the steam being supplied to the water tank;
a second passageway to circulate and heat water supplied from the water tank, the circulated and heated water being supplied to the reformer, the first passageway and the second passageway each being of a serpentine shape;
a substrate having a first face and a second face;
a first channel arranged in the first face of the substrate, the first passageway arranged within the first channel;
a second channel arranged in the second face of the substrate, the second passageway arranged within the second channel;
a first cover plate arranged on the first face of the substrate, the first cover plate covering the first channel; and
a second cover plate arranged on the second face of the substrate, the second cover plate covering the second channel.

7. The fuel cell system of claim 6, the heat exchanger being comprised of a metal selected from a group consisting of aluminum, stainless steel, copper, nickel and steel.

8. The fuel cell system of claim 6, the fuel cell stack comprising:
a pair of separators; and
a membrane-electrode assembly (MEA) arranged between the separators.

9. The fuel cell system of claim 6, the fuel cell stack including a plurality of electricity generators to generate electricity, the electricity generators being arranged in series and being in contact with one another.

10. The fuel cell system of claim 6, the fuel cell stack including a steam outlet connected to the heat exchanger to discharge steam generated within the fuel cell stack.

* * * * *